United States Patent [19]

Dalli et al.

[11] E Re. 28,910

[45] Reissued July 20, 1976

[54] PUSH-IN EASY-OPENING CLOSURES

[75] Inventors: Alan George Dalli, Warrandyte; Michael Debenham, Frankston; Ralph Edward Schackleford, Emerald, all of Australia

[73] Assignee: The Broken Hill Proprietary Company Limited, Melbourne, Australia

[22] Filed: Apr. 4, 1975

[21] Appl. No.: 565,078

Related U.S. Patent Documents

Reissue of:

[64] Patent No.: 3,759,206
Issued: Sept. 18, 1973
Appl. No.: 180,785
Filed: Sept. 15, 1971

[30] Foreign Application Priority Data

Sept. 16, 1970 Australia ..... 2556/70

[52] U.S. Cl. ..... 113/121 C; 113/116 BB; 220/268

[51] Int. Cl.[2] ..... B21D 51/00

[58] Field of Search ..... 113/116 BB, 121 C; 220/265, 266, 268, 341, 378; 215/250; 83/108

[56] References Cited

UNITED STATES PATENTS

| | | | |
|---|---|---|---|
| 625,055 | 5/1899 | Painter | 215/250 |
| 932,341 | 8/1909 | Smith | 113/116 BB |
| 1,878,677 | 9/1932 | Curtis | 220/378 |
| 2,176,898 | 10/1939 | Fried | 220/27 |
| 2,261,117 | 11/1941 | Jack, Jr. | 220/268 |
| 2,324,155 | 7/1943 | Haynes | 220/266 |
| 2,652,169 | 9/1953 | Brusienski | 222/81 |
| 2,787,394 | 4/1957 | Baumann | 220/27 |
| 2,789,718 | 4/1957 | Baumann | 220/27 |
| 2,842,295 | 7/1958 | Bajada | 222/485 |
| 3,195,763 | 7/1965 | Fried et al. | 220/54 |
| 3,227,304 | 1/1966 | Asbury | 220/48 |
| 3,236,409 | 2/1966 | Cross et al. | 220/47 |
| 3,246,791 | 4/1966 | Asbury | 220/47 |
| 3,261,497 | 7/1966 | Lipske | 220/265 |
| 3,266,452 | 8/1966 | Taylor | 113/121 C |
| 3,341,057 | 9/1967 | Frankenberg | 220/54 |
| 3,355,058 | 11/1967 | Asbury | 220/48 |
| 3,362,569 | 1/1968 | Geiger | 220/48 |
| 3,410,436 | 11/1968 | Foss et al. | 215/40 |
| 3,445,027 | 5/1969 | Palmer | 220/54 |
| 3,552,341 | 1/1971 | Lannin | 113/116 BB |
| 3,575,122 | 4/1971 | Brossart, Jr. | 113/116 BB |

FOREIGN PATENTS OR APPLICATIONS

| | | |
|---|---|---|
| 2,556 | 9/1970 | Australia |

*Primary Examiner*—Lowell A. Larson
*Attorney, Agent, or Firm*—Murray and Whisenhunt

[57] ABSTRACT

This specification discloses an easy-opening closure for a can end which comprises an opening formed by partially severing a portion from the can end to leave the portion attached thereto by an integral neck, and a closure member formed from said severed portion and which is larger than said opening. The sheet metal adjacent the free edge of the opening is downwardly turned while the sheet metal adjacent the free edge of the closure member is upwardly turned, said free edges being in contact with or in close proximity to each other. A sealant is applied at least in the region of the free edges if required by the purpose for which the can end is to be used. The specification also discloses a method of forming such a closure comprising the steps of: forming an upwardly directed bulge in the sheet metal, thus stretching the sheet; partially severing a central portion of said bulge, to define an opening and said severed portion defining a closure member for said opening, and displacing the closure member downwardly so that its free edge is below the free edge of the opening; partially flattening the thus truncated bulge of sheet metal around said opening to reduce its size, and turning downwardly said free edge defining said opening; partially flattening the closure member to increase its size, and turning upwardly said free edge of the closure member, the free edge portion of said closure member being in contact with or in close proximity to said free edge defining said opening, and applying a sealant at least in the region of the free edges of the opening and the closure member to seal the closure if required by the purpose for which said container member is to be used.

20 Claims, 17 Drawing Figures

PUSH-IN EASY-OPENING CLOSURES

Matter enclosed in heavy brackets [ ] appears in the original patent but forms no part of this reissue specification; matter printed in italics indicates the additions made by reissue.

This invention relates to easy-opening closures for containers made at least partly from sheet metal, such as metal cans for beverages of all kinds, other liquids, and pourable products.

The most widely marketed easy-opening closures for beverage cans are formed in can ends made from aluminum or an aluminum alloy, the closure member being defined by a score line that weakens the metal and having attached to it a pull ring for tearing the closure member from the can end. In another type of closure, a tinplate can end has an insert of aluminum that incorporates a closure member defined by a score line. Again, a pull ring is attached to the closure member to enable it to be torn from the can end.

Can ends made from steel or tinplate and incorporating a score line defining an easy-opening closure adapted for removal by a pull ring are also known. However, the disadvantage with such closures is that the scoring operation causes work hardening of the steel, thus making more difficult the easy removal of the closure by the usual tearing operation. The difficulty is accentuated when the edge of the scoring tool becomes rounded in use. Then the strength of the deformed metal can reach levels where the forces necessary to tear the score are higher than those necessary to tear the adjacent sheet. As a result, the tear does not follow the score line and the can becomes difficult to open and dangerous in use.

A major disadvantage of such "tear-out" closures is that they are relatively complicated and costly to manufacture. Another disadvantage is that the closure member, after being torn from the container, is usually thrown away thus producing a serious litter problem.

Easy-opening closures which are not torn out of the container have been proposed. Such closures are opened by displacing the closure member into the container. One such proposal is disclosed in Klein and Harper U.S. Pat. No. 3,334,775 which describes a closure formed by drawing and shaping the sheet metal so that it is underfolded in two superimposed 180° folds, the push-in closure member or gate panel being defined by a score cut near the lower of these folds. Since access to the sheet metal is available only from the underside, a conventional shearing operation is not possible and the score cut must be made by forcing a knife into the sheet metal. This constitutes a major disadvantage because the service life of such a knife is likely to be short when the closure is made from steel or tinplate especially when these are of high temper. Another disadvantage is that the formation of the superimposed 180° folds involves severe deformation of the sheet metal and this can cause stress cracking especially if the formation is attempted at high speed.

The primary object of the invention is therefore to provide an easy-opening closure that can be readily and economically formed from steel or tinplate and that avoids the abovementioned disadvantages. Another object of the invention is to provide an easy-opening closure that can be economically formed from aluminum or aluminum alloy and that has a closure member which is not removed from the confines of the container when the closure is opened thus reducing the litter problem.

In accordance with the invention, therefore, there is provided in a container member formed from sheet metal, an easy-opening closure comprising an opening formed by partially or wholly severing a portion of the sheet metal of said container member, the free edge of said sheet metal from which said portion is severed defining said opening, and a closure member formed from or comprising said severed portion and which is larger than said opening, said closure member having part of a free edge portion thereof in contact with or in close proximity to said free edge defining said opening, or the interior surface of the sheet metal adjacent said opening, said closure member having a sealant at least in the region of the free edges of said opening and closure member if required by the purpose for which said container member is to be used and being adapted to be pushed away from said interior surface to open the closure.

The closure member is larger than the opening in order that any internal pressure arising from the contents, e.g., carbonated beverages, of the container is resisted by the overlap.

Preferably, said portion is only partially severed from said container member to leave an integral neck that serves as a hinge during the opening operation and ensures that the closure member remains connected to the container member. Alternatively, a hinge may be formed separately, such as by a strong adhesive material.

In the present specification, the term "container member" is intended to include any integral part of a container, such as part of the container body, a container end or an insert adapted to form part of a container body or end. The term "sheet metal" includes steel, tinplate, aluminum and its alloys, other metals suitable for container manufacture, and laminates of these metals with relatively thin plastic films. The term "severing" means an incision extending through the full thickness of the sheet metal from one surface to the other. Thus "partially severing portion of the sheet metal" means that such portion remains attached to the parent metal only by one or more necks of unincised metal between the two ends of the incision or incisions. The term "free edge" means the metal surface created by the incision and includes the corners defining said surface. The term "free edge portion" includes the free edge as defined as well as the sheet metal adjacent to the corners of the free edge. The term "in close proximity" includes spacings such that a seal effective for the purpose for which the container member is to be used is obtained by the use of a suitable conventional sealant. In the case of constructions not requiring sealant, say for powders, the term includes spacings such that the contents of the container can not escape.

When the contents of the container are at or below atmospheric pressure, the invention provides an easy-opening closure as hereinbefore described and in which a segment or segments of the free edge portion of the closure member are formed to extend over the exterior surface of the sheet metal adjacent to the opening. The extent to which this overlap occurs is designed to resist opening of the closure by atmospheric pressure or accidental contact but to allow opening of the closure by finger pressure.

The invention also provides a method of forming an easy-opening closure in a container member formed from sheet metal comprising partially or wholly severing a portion of the sheet metal, the free edge of said sheet metal from which said portion is severed defining an opening and said severed portion defining a closure member for said opening, and then reducing the size of said opening and/or increasing the size of said closure member, a part of a free edge portion of said closure member being in contact with or in close proximity to said free edge defining said opening or the interior surface of the sheet metal adjacent said opening and applying a sealant at least in the region of the free edges of the opening and closure member if required by the purpose for which said container member is to be used.

In order that the invention may be more clearly understood, typical preferred forms thereof are hereinafter more fully described with reference to the accompanying drawings in which.

For clarity the Figures show the configurations of the metal defining the closure during the various stages of formation in a somewhat exaggerated and idealized form. The actual configurations may therefore depart from those shown.

Figure 1:
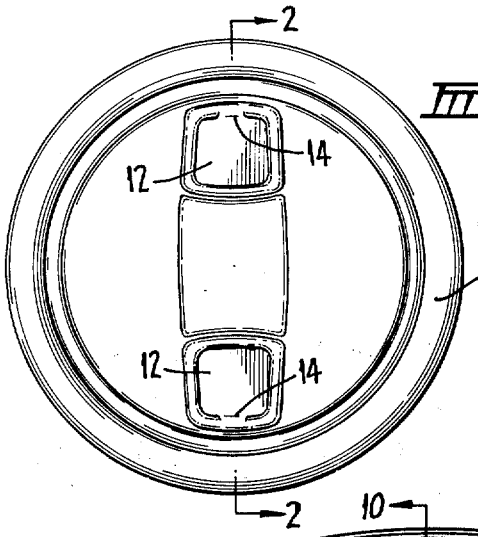
FIG. 1 is a plan view of one form of a can end embodying the invention.
Figure 2:
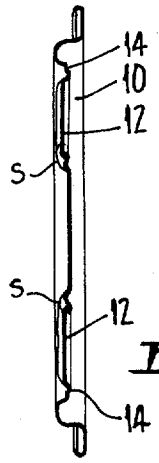
FIG. 2 is a sectional elevation view taken along the line 2—2 of FIG. 1.

The can end 10 shown in the drawings comprises a circular disc of tinplate, the rim of which is performed (FIG. 2) in the usual way for subsequent attachment by a seaming operation to the upper end of a can body.

Figure 3:
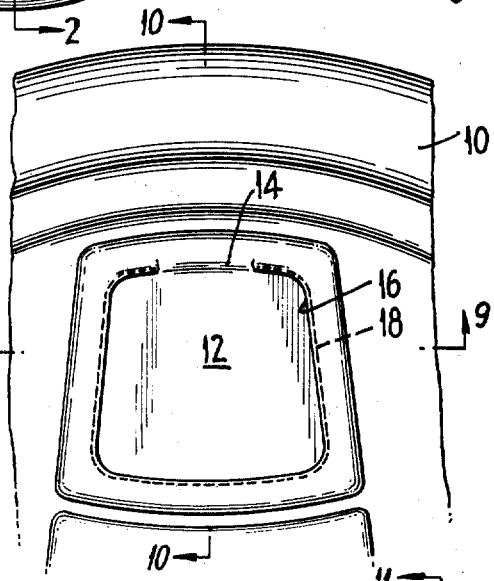
FIG. 3 is an enlarged plan view of one closure of the can end of FIG. 1.
Figure 10:
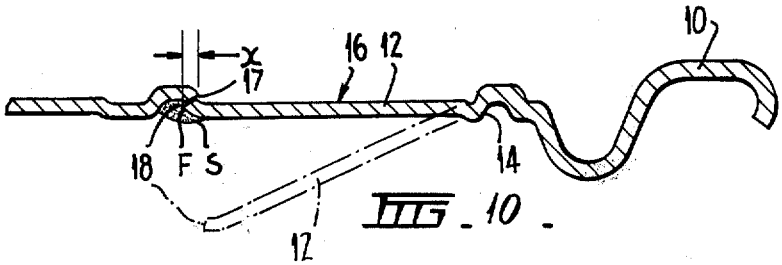
FIG. 10 is a sectional elevation view taken along the line 10—10 of FIG. 3.

The can end 10 is provided with a diametrically opposed pair of easy-opening closures each including an integral push-in closure member 12 which has been severed from the disc and each of which remains connected thereto by a narrow neck 14 which is best shown in FIGS. 3 and 10, each such neck being arranged centrally at the outer end of the respective closure member 12 and serving as a hinge during the closure opening operation.

The particular location of the neck or hinge 14 with respect to closure member 12 has been chosen to strengthen the can end in resisting internal pressure created by the contents of the can. However, other locations can be used providing the can end can resist the maximum internal pressure for the particular application.

The formation of each closure member 12 in the can end 10 provides a corresponding opening 16 defined by the free edge 17 of the can end 10 which is created by the severing of closure member 12 from the can end 10 but each such opening is completely covered and sealed by the respective closure member 12 until the latter is subsequently pressed downwardly, as shown in broken lines in FIG. 10, to open the closure. It will be appreciated that only one such closure member 12 need be formed in the end 10 and that the closure or closures may assume any desired shape or configuration. The shape shown in the drawings has been chosen both for its pouring characteristics and its aesthetic appeal.

Figure 9:
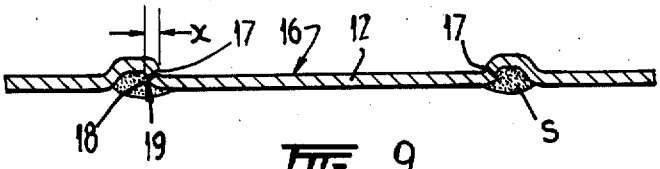

As best seen in FIGS. 9 and 10, the free edge 18 of the free edge portion 19 of the closure member 12 is in contact with or in close proximity to the free edge 17 of the opening 16. The closure member 12 is most desirably formed so as to be resiliently biased towards the opening 16 so that contact with the free edge 17 of the opening occurs at least around some of its periphery. Clearly, since the closure member 12 has part of its free edge 18 beyond or outside the free edge 17 of the opening 16, the area of the closure member 12 is larger than that of the opening 16. The amount of overlap between the closure member 12 and the opening 16 is indicated by the distance x in the various Figures. Hence, the closure member will be positively restrained from being displaced upwardly by internal pressure in a can to which he end 10 is applied. The application of a suitable sealant S to seal any gap between the free edge 18 of the closure member 12 and the free edge 17 opening 16 results in the closure providing an hermetically sealed can after filling and completion. To gain access to the contents, the closure member may be readily pushed downwardly as shown in FIG. 10 and when so displaced remains attached by neck 14 to the can end 10.

The sealants may be any suitable polymer, either natural or synthetic. Typical sealants that may be used are those based on polyvinyl chloride, polyvinyl dichloride, polyethylene or its copolymers, polyamides, and the like. Conceivably, soft solder could also be used. The coating of lacquer commonly applied to the interior surfaces of metal containers may serve to seal the closure.

If a relatively viscous sealant is applied to the interior of the closure, unsightly penetration of sealant to the exterior does not take place even if the closure member is not in a close proximity to the opening as would have to be the case when a relatively fluid sealant is used. In both cases, the objective is to prevent unsightly penetration of sealant to the exterior surface of the closure, and to obtain an effective seal after the sealant has been subjected to the normal curing process. We have found that when using a conventional polyvinyl chloride resin with a plastisol, for example a commercial product made by W. R. Grace Australia Ltd. and known as Darex cap compound no. 6385–A4, the proximity of the closure member to the opening is not critical, and a gap of a few thousandths of an inch (a few 0.025 mm) can be tolerated without difficulty.

The general method of forming each closure 12 is illustrated in successive stages in FIGS. 6, 7, 8 and 9 though it will be apparent to those skilled in the art that the required result is not dependent upon using the particular shapes which are illustrated and that the number of forming operations could be reduced or increased.

Figure 6:
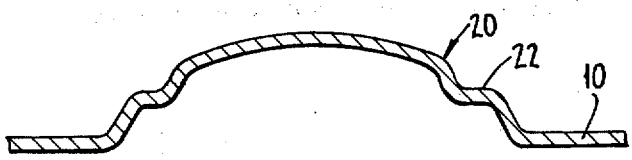
FIG. 6 is a sectional elevation view taken along the line 9—9 of FIG. 3 and shows the first stage in the formation of a closure in the can end shown in the preceding figures.

Referring to FIG. 6, an upward bulge 20 is formed initially in can end 10, either before, after or during formation of its rim, thus stretching the sheet metal within the region of the bulge 20. The bulge 20 has a shoulder 22 where the metal is generally parallel to the plane of the undeformed sheet metal around the bulge 20.

Figure 7:
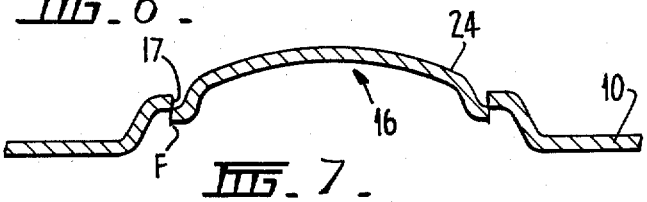
FIGS. 7, 8 and 9 are sectional elevation views taken along line 9—9 of FIG. 3, showing successive stages in the formation of the said closure.

In the succeeding operation shown in FIG. 7, a generally central portion 24 of the bulge 20 is partially severed approximately centrally of the shoulder 22, thus defining the portion which will be formed into the closure member 12 and also defining the opening 16. The portion 24 which remains connected to the can end by the unincised neck 14 of sheet metal not visible in FIGS. 6 to 9, is also displaced downwardly so that its free edge 18 is below the free edge 17 defining the opening 16. As FIG. 7 clearly shows, the portion 24 and the opening 16 are surrounded by flat rims, formerly parts of the shoulder 22.

Figure 8:
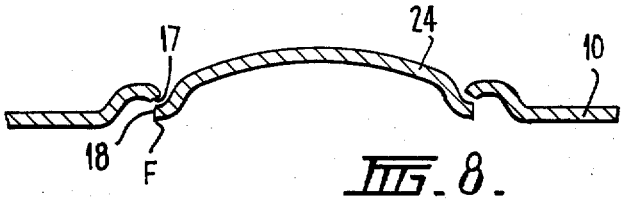

In the next operation shown in FIG. 8, the truncated portion of bulge 20 around the opening 16 including the flat rim is partially flattened, thus reducing the size of the opening 16 by forcing its free edge 17 inwardly. The free edge 17 is also turned downwardly, which has the important result of presenting a smooth periphery to the opener's fingers or lips should he drink from the can.

In the final operation shown in FIG. 9, the closure member 12 is partially flattened, thus increasing its size by forcing its free edge 18 outwardly. The free edge 18 is also turned upwardly so that it is in contact with or at least in close proximity to the free edge 17 of the opening 16. The upward turning of the free edge of the closure member has the advantage that any fin F of raw and ragged metal produced by the shearing operation at the lower corner of the free edge 18 of the closure member 12 is located more definitely in the region of application of sealant S around the gap. The covering of the fin F with sealant is desirable in order to prevent contact of raw metal with the contents of the can.

As those skilled in the art will appreciate, the steps shown in FIGS. 6 and 7 may be performed in one die operation. Similarly, the steps shown in FIGS. 8 and 9 may also be performed simultaneously, the sealant application normally being a separate operation.

The downward and upward turning of the free edges of the opening and the closure member respectively is of course achieved by the use of suitably shaped dies. Using known techniques, the dies are also designed so that the closure member is resiliently biased towards the opening as previously mentioned.

The desirable amount of overlap x depends inter alia on the size of the closure, the properties of the sheet metal, and the pressure in the container for which the can end is made. By way of example, an end for a beer can made from high temper tinplate about 0.012 inches (0.3 mm) thick, we have found that an overlap x of 0.015 inches (0.38 mm) is very satisfactory.

It will be appreciated that complete overlap between the free edges 17 and 18 may be desirable and in such a case, the free edge 17 is preferably disposed outwardly of and above the lever of free edge 18. Here the contact or close proximity may be between free edge 17 and the outside surface of free edge portion 19 or between free edge 18 and the interior surface of can end 10 adjacent opening 16. However, it should be appreciated that complete overlap is not essential and that the embodiment described above is a commercially workable and acceptable embodiment.

Many alternatives exist for obtaining the desired overlap between the closure member and the opening although some of these have obvious disadvantages. For example, the whole of the bulge or only the central portion of it falling within the shoulder may be formed downwardly. In this case, there is contact (or close proximity) between the interior surface of the can end and the exterior surface of the free edge portion of the closure member.

Another alternative construction is shown in FIGS. 13 to 17 where parts similar to those of the first embodiment are indicated by the suffix c. As in the first embodiment, the closure member 12c remains connected to the end 10c by a neck 14c of metal and the free edge 18c of the free edge portion 19c is disposed beyond or outside the free edge 17c of the opening 16c. However, the edge portion 19c and the edge 17c are not turned upwardly and downwardly but remain in their severed orientation as clearly shown in FIG. 14. It will be seen that there is contact (or close proximity) between the free edge 17c and the exterior surface of the free edge portion 19c.

Figure 15:
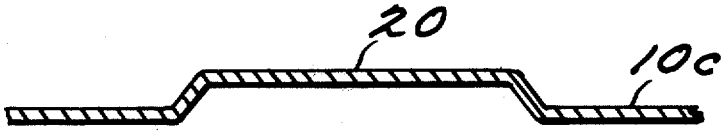
Figure 16:
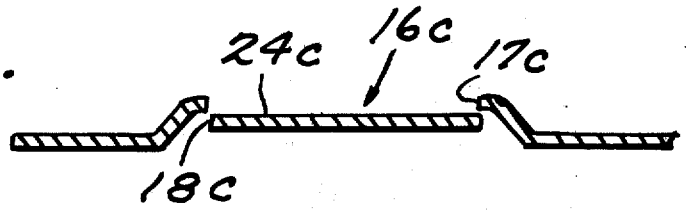
Figure 17:
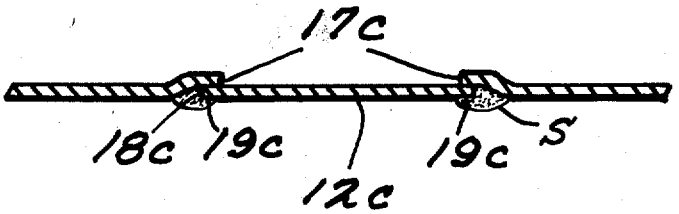

The method of forming the closure 12c is illustrated in its successive stages in FIGS. 15, 16 and 17. In the first stage (FIG. 15) an upward flat-topped bulge 20 is formed to the height of shoulder 22 of the first embodiment. In the second stage (FIG. 16) a generally central portion 24c of the bulge 20 is severed from end 10c, except for a portion defining the neck 14c, and the severed portion is displaced downwardly so that its free edge 18c is below the free edge 17c of the opening. The final stage (FIG. 17) involves the partial flattening of the truncated bulge around the opening to reduce the opening to a size smaller than the size of the closure member 12c, and then the application of a sealant S as in the first embodiment.

Alternatively again, the bulge may be annular in shape with the central portion being in the plane of the undeformed sheet or at any rate lower than the height of the annulus. Severance of the metal around the highest part of the annulus then defines an opening and a closure member each having a raised rim which when partially flattened reduces the size of the opening and increases the size of the closure member.

Figure 4:
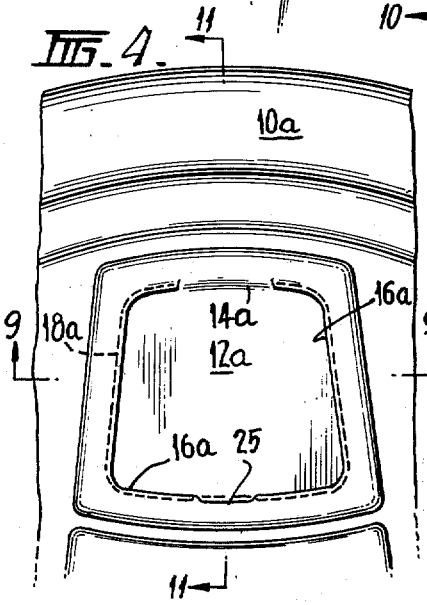
FIG. 4 is a plan view of a form of can end suitable for containers having contents at or below atmospheric pressure.
Figure 11:
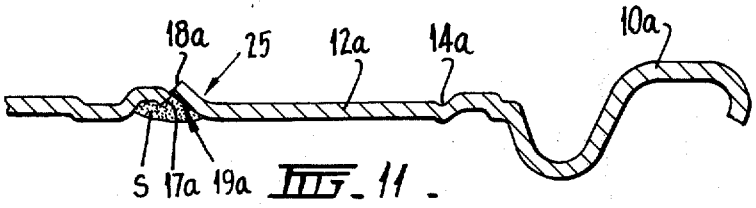
FIG. 11 is a sectional elevation view taken along the line 11—11 of FIG. 4.

In the can end shown in FIGS. 4 and 11, where parts similar to those of the previous embodiment are indicated by the suffix a, suitable for contents at atmospheric pressure or below, the closure member 12a has some of its free edge portion 19a at 25 in contact with or closely overlying the exterior surface of the can end 10. This prevents the closure member 12a from being opened by accidental contact or by atmospheric pressure. In practice, the width of the overlap between edge 15 and the periphery of the opening would be much less than that shown in FIG. 4 and even in FIG. 11. At each extremity of the overlap 25, a short incision may be made in the edge of the closure member 12a in order to facilitate the change in position of the edge 18a from the interior surface to the exterior surface of the can end.

Figure 5:
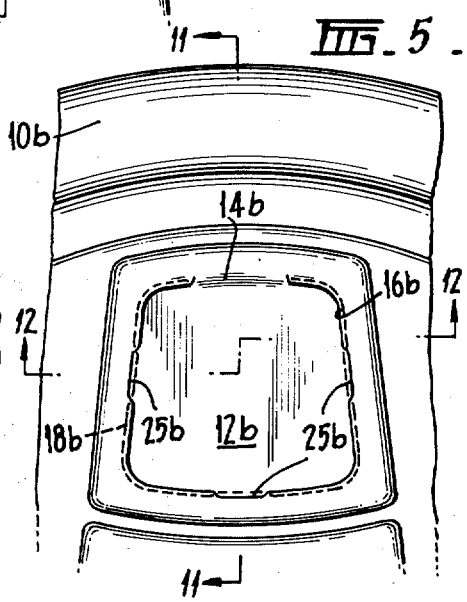
FIG. 5 is a plan view of a modified form of can end suitable for containers with contents at or below atmospheric pressure.
Figure 12:
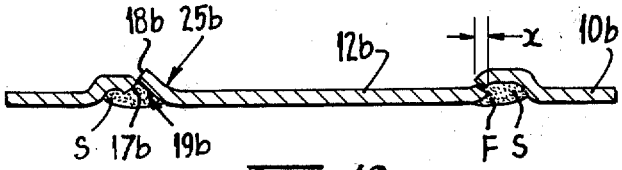
FIG. 12 is a sectional elevation view taken along the line 12—12 of FIG. 5.
Figure 13:
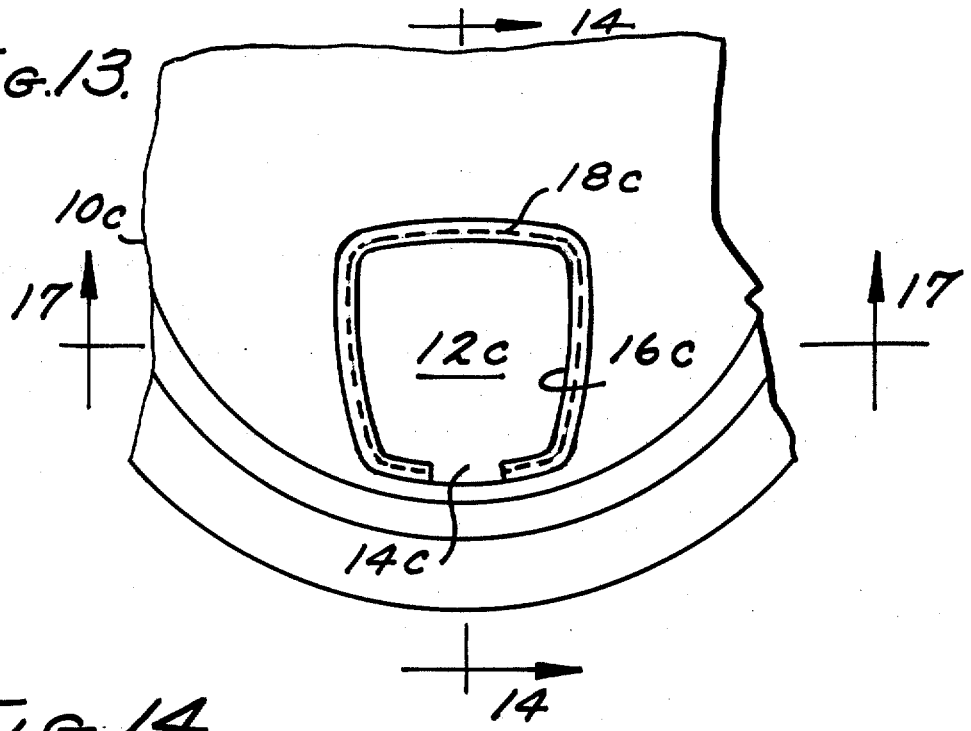
Figure 14:
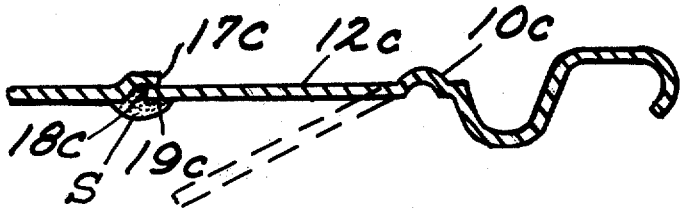

FIGS. 5 and 12, where the suffix b is used, shows an alternative easy-opening closure which has three segments 25b of free edge 19b on the exterior surface of the can end.

In each of the embodiments, the easy-opening closure and the immediately surrounding parts of the can end may be covered by a removable adhesive covering strip of paper, plastic film or other suitable material if this is found desirable for reasons of hygiene.

The embodiments described are primarily intended for cans having liquid contents. Cans for powdered, granular or other non-liquid contents would not essentially require a sealant since a small dab of adhesive in one or more places aroound the closure member would be satisfactory. The closure would of course be designed so that any gap between the closure and opening would not allow the contents to escape. For substances such as salt and pepper, perforated caps may be provided to fit into the opening after the closure member has been displaced.

In the easy-opening closure defined above, and all other closures embodying the essential features of the invention there is an essential difference between our invention and that disclosed in U.S. Pat. No. 3,334,775. Whereas in our invention, the closure member is larger than the opening as defined by its free edge, the gate panel or closure member in said disclosure is larger than the opening defined by the convex rim of the upper 180° fold and is not larger than the opening defined by the score cut. In fact, the gate panel may be considered to be smaller than the opening defined by the score cut by an amount of the width of the cut. Furthermore our closures do not require severe metal deformation during their formation. Accordingly, when our closures are formed from high temper (e.g., Temper 6) or double reduced steel the metal does not suffer from stress cracks and therefore such closures have distinct advantages over the above U.S. art. When formed from low temper steel (such as for contents at atmospheric pressure) the closures have the advantage that their formation is simple and economic.

We claim:

1. A method of forming an easy-opening, *push-in* closure in a sheet metal container member, said method comprising:

forming a bulge in an area of the sheet metal container member, at least partially severing a portion of the sheet metal in said area to provide a free edge, wherein at least a portion of said bulge lies substantially outside of said portion, the free edge of the sheet metal from which said portion is at least partially severed defining an opening, and said severed portion defining a closure member for said opening,

*wherein said bulge includes an approximately flat area of sheet metal that is generally parallel to the plane of the sheet metal surrounding said bulge, said severing being carried out substantially within said flat area,* thereafter reducing the size of said opening by at least partly flattening said buldge, to place [ at least a part of the free edge portion of said closure member and ] the free edge defining said opening or the interior surface of the sheet metal adjacent said opening in overlapping contact or in overlapping close proximity *over at least a part of the free edge portion of said closure member,* whereby said container member having said easy-opening closure is suitable for use in forming a container for liquids.

2. Method as claimed in claim 1, wherein said portion of the sheet metal is only partially severed with at least one unsevered area connecting said closure member to the remainder of said sheet metal and serving as a hinge during the closure opening operation.

[ 3. Method as claimed in claim 2, wherein said bulge includes an approximately flat area of sheet metal that is generally parallel to the plane of the sheet metal surrounding said bulge, said severing being carried out substantially within said flat area. ]

4. Method as claimed in claim [ 3 ] *1*, wherein said sheet metal is steel.

5. Method as claimed in claim 4, wherein after said bulge is flattened, a sealant is applied to at least the region of the free edges of said opening and said closure member.

6. Method as claimed in claim 4, wherein the container contents are below atmospheric pressure.

7. Method as claimed in claim 4, wherein the container contents are above atmospheric pressure.

8. Method as claimed in claim 2, wherein said bulge is formed before said portion is severed.

9. Method as claimed in claim 8, wherein the size of said closure member is increased prior to the application of said sealant.

10. Method as claimed in claim 9, wherein said closure member is bulged when severed, and thereafter the bulged closure member is flattened to increase the size thereof.

11. Method as claimed in claim 2, wherein said free edge portion of said closure member has a plurality of segments, at least one of said segments overlying a surface of the sheet metal adjacent said opening, and at least one other of said segments overlying the opposite surface of the sheet metal adjacent said opening.

12. [ Method as claimed in claim 2 ] *A method of forming an easy-opening closure in a sheet metal container member, said method comprising forming a bulge in an area of the sheet metal container member, at least partially severing a portion of the sheet metal in said area to provide a free edge wherein at least a portion of said bulge lies substantially outside of said portion, the free edge of the sheet metal from which said portion is at least partially severed defining an opening, and said severed portion defining a closure member for said opening, thereafter reducing the size of said opening by at least partly flattening said bulge to place at least a part of the free edge portion of said closure member and the free edge defining said opening or the interior surface of the sheet metal adjacent said opening in overlapping contact or in overlapping close proximity, whereby said container member having said easy-opening closure is suitable for use in forming a container for liquids, wherein said portion of the sheet metal is only partially severed with at least one unsevered area connecting said closure member to the remainder of said sheet metal and serving as a hinge during the closure opening operation*; wherein said unsevered area is located in the bulged area of the sheet metal container member.

13. A method of forming an easy-opening closure in a container member of sheet metal comprising the following steps:

1. forming a bulge in the sheet metal, thus stretching the sheet;
2. partially or wholly severing a central portion of said bulge to provide a free edge, the free edge of said sheet metal from which said portion is severed defining an opening and said severed portion defining a closure member for said opening;

3. displacing the closure member in the opposite direction from said bulge so that its free edge is in a different plane than the free edge of the opening;
4. at least partially flattening the bulge of sheet metal around said opening to reduce its size and to place at least a part of the free edge portion of said closure member and said free edge defining said opening or the surface of the sheet metal adjacent said opening in overlapping contact or in overlapping close proximity, and
5. applying a sealant at least in the region of the free edges of the opening and the closure member to seal the closure if required by the purpose for which said container member is to be used, whereby said container member having said easy-opening closure is suitable for use in forming a container for liquids.

14. Process as claimed in claim 13, wherein the free edge defining said opening is displaced in the direction of the closure member displacement.

15. Method as claimed in claim 13, wherein steps (1) and (2) are in a single operation.

16. Method as claimed in claim 13, wherein said bulge includes an approximately flat area of sheet metal that is generally parallel to the plane of the sheet metal surrounding said bulge, said severing being carried out substantially within said flat area.

17. Method as claimed in claim 16, wherein said portion of the sheet metal is only partially severed with at least one unsevered area connecting said closure member to the remainder of said sheet metal and serving as a hinge during the closure opening operation.

18. Method as claimed in claim 17, wherein said sheet metal is steel.

19. Method as claimed in claim 13, wherein the closure member is bulged when severed and thereafter the bulged closure member is at least partially flattened to increase its size.

20. A method of forming an easy-opening closure in a sheet metal container member, the steps comprising:

forming a bulge in an area of the member to displace metal in said area generally normally on the sheet;

at least partially severing a portion of the displaced sheet metal inwardly of the periphery thereof to provide a free edge of displaced metal outwardly of the severed portion at least partially defining an opening, with said severed portion defining a closure member for said opening;

*wherein said bulge includes an approximately flat area of sheet metal that is generally parallel to the plane of the sheet metal surrounding said bulge, said severing being carried out substantially within said flat area;* and reducing the size of said opening by at least partly flattening the said displaced metal defining said opening to move the marginal portion of the free edge and the marginal edge portion of the closure member into overlapping relationship.

21. [ Method as claimed in claim 2, ] *A method of forming an easy-opening closure in a sheet metal container member, said method comprising forming a bulge in an area of the sheet metal container member, at least partially severing a portion of the sheet metal in said area to provide a free edge wherein at least a portion of said bulge lies substantially outside of said portion, the free edge of the sheet metal from which said portion is at least partially severed defining an opening, and said severed portion defining a closure member for said opening, thereafter reducing the size of said opening by at least partly flattening said bulge to place at least a part of the free edge portion of said closure member and the free edge defining said opening or the interior surface of the sheet metal adjacent said opening in overlapping contact or in overlapping close proximity, whereby said container member having said easy-opening closure is suitable for use in forming a container for liquids, wherein said portion of the sheet metal is only partially severed with at least one unsevered area connecting said closure member to the remainder of said sheet metal and serving as a hinge during the closure opening operation* wherein the free edge defining said opening is displaced towards the free edge portion of the closure member, whereby the easy-opening closure presents a smooth opening periphery to an opener's finger.

* * * * *